United States Patent Office 3,053,876
Patented Sept. 11, 1962

---

3,053,876
PHOSPHORUS COMPOUNDS AND PROCESS FOR THEIR PRODUCTION
Hugo Malz, Leverkusen-Wiesdorf, Engelbert Kühle, Koln-Stammheim, and Otto Bayer, Leverkusen-Bayerwerk, Germany, assignors to Farbenfabriken Bayer Aktiengesellschaft, Leverkusen, Germany, a corporation of Germany
No Drawing. Filed Oct. 14, 1960, Ser. No. 62,555
Claims priority, application Germany Oct. 17, 1959
18 Claims. (Cl. 260—461)

The present invention relates to and has as its objects new and useful phosphorus compounds of the general formula

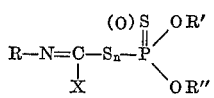

wherein R, R' and R'' stand for aliphatic or aromatic hydrocarbon radicals which may also be substituted, X may be a halogen atom, an amino group, an ether or thioether radical, a possibly substituted hydrocarbon radical or also a further radical

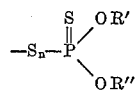

and wherein n means 0 or 1. The aforeshown compounds are distinguished by a remarkable pesticidal activity.

A process for the production of these new compounds consists in reacting isocyanide-mono- or -dihalides or imidohalides or carbodiimides with thionothiol- or thiolphosphates or with phosphorous acid esters.

The preparations of a number of isocyanide dichlorides of the general formula

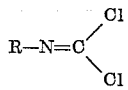

wherein R has the above significance, is known from the literature. The two halogen atoms of this class of compounds are chemically highly reactive. In the sense of the invention they react with thionothiol- or thiolphosphates according to the following reaction scheme:

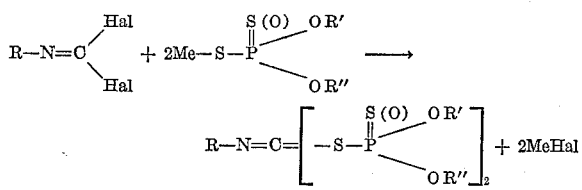

Me denotes alkali metal or an ammonium radical, the other symbols being the same as said before.

It is expedient to use for this reaction alkali metal or ammonium salts of thiol- or thionothiolphosphoric acid and to react them with the isocyanide halides, preferably with the use of inert solvents or diluents. The free acids may also be used and in this case the addition of acid binders such as tertiary amines is advisable. In order to accelerate the reaction, it is expedient to work at moderately elevated temperatures of about 40–80° C.

When using phosphorous acid esters the reaction with isocyanide chlorides proceeds as a so called Arbuzov reaction according to the following equation:

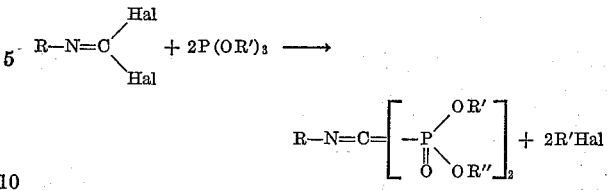

In this case, additions of solvents or diluents are, in general unnecessary. It is sufficient in most cases to mix the reaction partners and to bring them to moderately elevated temperatures of about 50–100° C. whereupon the reaction proceeds smoothly. Inert solvents may sometimes be useful for a better control of the reaction.

Instead of isocyanide dihalides it is also possible to use for the reactions here described derivatives of this class of compounds in which one halogen atom is already substituted by a reaction with suitable reaction components. Such derivatives are especially those reacted with equimolecular amounts of amines, alcoholates or mercaptides. Imido-halides react in the same way, i.e. compounds of the formula

in which the symbol X stands for a possibly substituted hydrocarbon radical. With regard to their behaviour towards thionothiol- or thiolphosphates and phosphorous acid esters, they do not differ substantially from isocyanide dihalides. In these cases the reaction proceeds as follows:

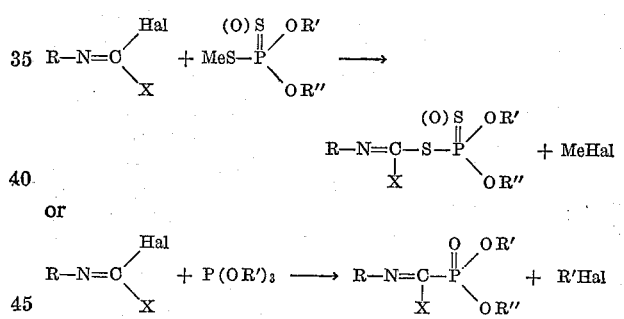

wherein R, R', R'' and X as well as Me have the aforementioned significance.

It is also possible according to this invention to react compounds containing the imide chloride grouping several times in the molecule with thiol- or thionothiol-phosphates or with phosphorous acid esters. This leads to compounds containing the radical

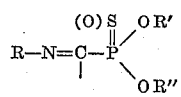

bonded several times in the same molecule.

If the following special groups of compounds

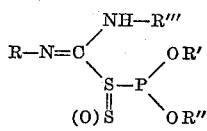

in which the symbols have the same significance as said above and R''' has also the same significance as R, R' and R'' (mostly R is the same as R'''), is desired, these compounds may be obtained by reacting thiono-thiol- or thiolphosphates with carbo-diimides. This reaction may be shown by the following equation:

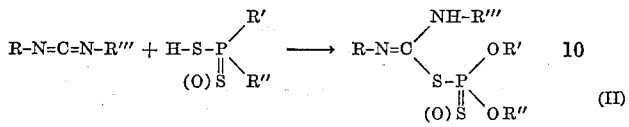

This reaction usually is exothermic and thus, the use of inert solvents is mostly advisable to smooth the reaction. Such solvents are e.g. benzene, gasoline, or other similar hydrocarbons.

The class of carbo-diimides useful as starting materials is well known from the literature. Especially such carbo-diimides may be reacted which according to their chemical nature are stable and do not tend to polymerisation.

It is said in the beginning that the radicals R, R' and R'' are aliphatic or aromatic hydrocarbons which also may be substituted, X may be a halogen atom, an amino group, an ether or thioether radical, a possibly substituted hydrocarbon radical or a further radical

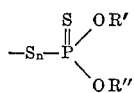

and $n$ is 0 or 1. More specifically X stands for chlorine or bromine, a lower dialkyl amino group, a phenyl amino group, in which the phenyl radical may be furthermore substituted by lower alkyl groups, halogen atoms, nitro groups, lower alkoxy groups and the like, a lower alkyl phenyl amino group, in which the phenyl radical may be furthermore substituted as said before, a lower alkoxy group, a phenoxy group, in which the phenyl radical may be furthermore substituted as said before, a lower alkyl-mercapto group, a phenyl-mercapto group, possibly substituted as said before, a lower alkyl group, a phenyl group, which again may be substituted as said above; the radical R more specifically is more or less the same as said before regarding X, if X stands for a hydrocarbon of aliphatic or aromatic nature. R' and R'' more specifically are lower alkyl radicals up to 4 carbon atoms. R''' mentioned in one general formula above as it is stated there generally is the same as R, but it also may stand for a different radical. Thus, R''' also may stand for a substituted alkyl radical such as a dialkyl amino alkyl radical. R' and R'' in some cases also may be phenyl or halogen-substituted phenyl radicals.

The new compounds of the present application are either oils some of which are distillable, or crystallized products. They have a yellow or pale brown color or no color at all and are stable at room temperature, even upon prolonged storing. In some cases they show a remarkable insecticidal action and are therefore to be used as plant protecting agents. They are applied in a manner known in principle, i.e. in combination with suitable solid or liquid extenders or diluents. Examples of such solid carriers are talc, chalk, bentonite, clay and the like. As liquid carriers they may be mentioned water (if necessary with commercial emulsifiers), alcohols, especially lower alcohols such as methanol or ethanol, ketones, especially lower ketones such as acetone or methyl ethyl ketone, liquid hydrocarbons and the like. The new compounds may furthermore be used in combination with each other or with known insecticides, fertilizers etc.

As examples for the special utility of the inventive compounds the ester of the folowing formulae (I) 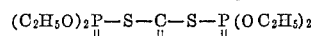
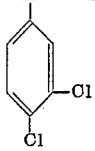

(II) 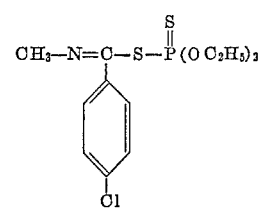

have been tested against mosquito larvae of the type *Aedes aegypti*. The test has been carried out as follows:

Aqueous dilutions of these above mentioned compounds have been prepared by admixing the active ingredient with the same amount of dimethyl formamide as an auxiliary solvent adding thereto 20% by weight referred to active ingredient of a commercial emulsifier consisting of a benzyl hydroxy polyglycol ether containing about 10 to 15 glycol residues, and diluting this premixture at last with water to the desired concentration indicated below.

About 20 larvae were brought into diluted aqueous emulsions prepared as described above. Counting of the dead pests occurred after 24 hours. The following results have been obtained:

| Compound | aqueous concentration (in percent active ingredient/water) | killing rate (in percent) |
|---|---|---|
| (I) | 0.001 | 100 |
| (II) | 0.001 | 100 |

The following examples are given for the purpose of illustrating the invention:

EXAMPLE 1

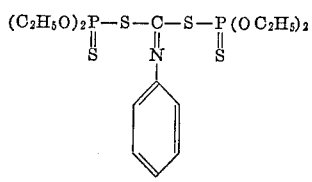

A solution of 8.7 grams of phenylisocyanide dichloride dissolved in 50 ml. of acetone is added dropwise while stirring to a suspension of 22.4 grams of the potassium salt of O,O-diethyl-thiolthiono-phosphoric acid in 200 ml. of acetone. The reaction mixture which acquires a yellow-brown color during the addition, is then heated to the boil for ½ hour. After cooling to room temperature, the potassium chloride formed in the course of the reaction is filtered off and the golden yellow clear solution concentrated by evaporation under vacuum. A brown oily residue is thus obtained which crystallizes upon cooling and rubbing with a glass rod. After re-crystallization from light gasoline, lemon-yellow crystals are obtained having a melting point of 72° C.

Calculated: $C_{15}H_{25}O_4NP_2S_4$—C, 38.1%; H, 5.3%; N, 3.0%; P, 13.1%; S, 27.1%. Found: C, 38.3%; H, 5.6%; N, 3.4%; P, 13.2%; S, 27.5%.

Nematicidal action:
With 200 p.p.m. 98% killing
With 100 p.p.m. 90% killing
With 50 p.p.m. 80% killing Flies are killed to 100% with 0.01% solutions and to 40% with 0.001% solutions. Mosquito larvae are killed completely with 0.001% solutions and to 40% with 0.0001% solutions. Helminticidal activity on sheep (Haemonchus) 150 mg./kg.=90% killing.

In a similar manner there may be obtained from the potassium salt of O,O-dimethyl-thionothiol-phosphoric acid and phenylisocyanide dichloride a compound of the following structure:

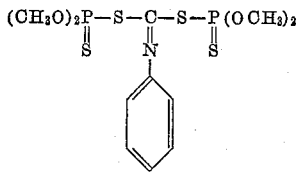

in the form of a yellow-red oil. Upon cooling, it solidifies to form yellow crystals of melting point 57–59° C. which become liquid again, however, upon standing in air.

Nematicidal action:
  With 100 p.p.m. 100% killing
  With 50 p.p.m. 100% killing

EXAMPLE 2

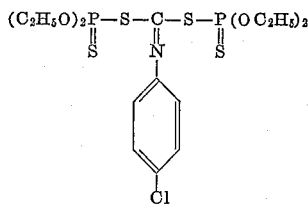

⅕ mol of the potassium salt of O,O-diethyl-thiolthionophosphoric acid is reacted with ⅒ mole of 4-chlorophenyl-isocyanide dichloride with the use of acetone as diluent, as described in Example 1. Upon concentration of the reaction solution, freed from the precipitated potassium chloride, golden yellow crystals are obtained which, after recrystallisation from petroleum ether, melt at 102° C.

Calculated: $C_{15}H_{24}O_4NP_2S_4Cl$—C, 35.5%; H, 4.7%; N, 2.8%; P, 12.2%; S, 25.2%; Cl, 7.0%. Found: C, 35.5%; H, 4.7%; N, 2.9%; P, 11.8%; S, 24.7%; Cl 7.7%.

Nematicidal action:
  With 200 p.p.m. 100% killing
  With 100 p.p.m. 100% killing
  With 50 p.p.m. 95% killing 0.1% solutions kill to 100% cockroaches, grain weevils, flies and larvae of flies. Helminticidal activity on sheep (Haemonchus) 150 mg./kg.=100% killing.

EXAMPLE 3

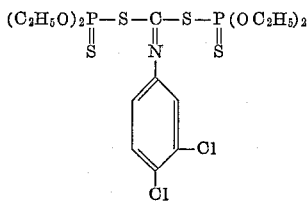

⅕ mol of the potassium salt of O,O-diethyl-thiolthionophosphoric acid is reacted with ⅒ mol of 2,4-dichlorophenyl-isocyanide dichloride as described in Example 1. As reaction product pale yellow crystals having M.P. 66° C. are obtained.

Calculated: $C_{15}H_{23}O_4NP_2S_4Cl_2$—N, 2.6%; P, 11.4%; S, 23.6%; Cl, 13.1%. Found: N, 2.7%; P, 11.2%; S, 23.4%; Cl, 13.1%.

Larvae of flies are killed completely with 0.01% solutions, mosquito larvae are killed completely with 0.001% solutions. 0.1% solutions kill to 100% caterpillars, flies, aphids and spider mites.

Helminticidal action on sheep: Haemonchus 100 mg./kg.=100% killing, Bunostomum 150 mg./kg.=100% killing.

In a manner corresponding to that described before there may be produced from 2,4-dibromo-phenylisocyanide dichloride and the potassium salt of O,O-diethyl-thionothiol-phosphoric acid a compound of the formula

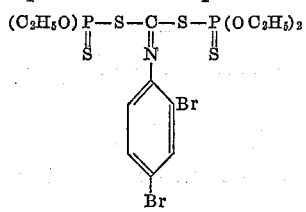

The product is obtained in the form of yellow crystals which, after re-crystallisation from alcohol, melt at 96–98° C.

EXAMPLE 4

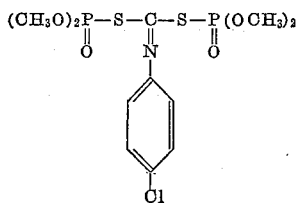

16.3 g. of the sodium salt of O,O-dimethyl-thiolthionophosphoric acid are suspended in 150 ml. of acetone and treated while stirring with a solution of 10.5 g. of 4-chlorophenyl-isocyanide dichloride in 150 ml. of acetone. Subsequently, the mixture is heated to the boil for about 3 hours. After cooling to room temperature, the precipitated sodium chloride is filtered off with suction and the solution concentrated by evaporation under vacuum. A colourless oil is thus obtained which solidifies in ice in a crystalline form and becomes liquid again at room temperature.

EXAMPLE 5

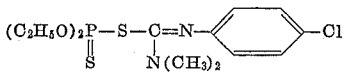

A solution of 15 g. of 4-chlorophenyl-isocyanide-(dimethylamido) chloride in 100 ml. of acetone is added dropwise with stirring to a solution of 14 g. of the ammonium salt of O,O-diethyl-thiolthiono-phosphoric acid. The colourless solution is then heated to the boil for ½ hour whereupon a colourless precipitate separates out which is filtered off with suction at room temperature. The clear filtrate is then concentrated by evaporation under vacuum. The residual oil is fractionated under vacuum, a colourless oil distilling over at 85–90° C./0.05 mm. Hg.

Calculated: $C_{13}H_{20}O_2N_2PS_2Cl$—C, 42.6%; H, 5.5%; N, 7.7%; S, 17.5%; Cl, 9.7%. Found: C, 42.1%; H, 5.3%; N, 7.5%; S, 18.8%; Cl, 10.5%.

EXAMPLE 6

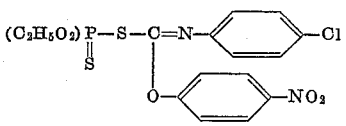

A solution of 31.1 g. of 4-chlorophenyl-isocyanide-(4-nitrophenoxy) chloride in 250 ml. of acetone is added dropwise with stirring to a suspension of 22.4 g. of the potassium salt of O,O-diethyl-thiolthiono-phosphoric acid in 250 ml. of acetone. The reaction mixture is then heated to the boil for ½ hours and the precipitated potassium chloride filtered off with suction at room temperature. After distilling off the solvent, a pale brown oil remains behind which partly solidifies in a crystalline form. After re-crystallisation from methanol, pale yellow crystals of M.P. 91–92° C. are obtained.

Calculated: $C_{17}H_{18}O_5N_2PS_2Cl$—N, 6.1%; P, 6.7%; S, 13.9%; Cl, 7.7%. Found: N, 6.2%; P, 7.1%; S, 14.6%; Cl, 7.7%.

EXAMPLE 7

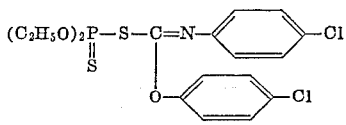

When equimolar amounts of the potassium salt of O,O-diethyl-thiolthiono-phosphoric acid and of 4-chlorophenyl-isocyanide-(4-chlorophenyl ester) chloride are reacted with one another as described in Example 6, colourless crystals of M.P. 87–89° C. are obtained as reaction product.

Calculated: $C_{17}H_{18}O_3NPS_2Cl_2$—N, 3.1%; P, 6.9%; S, 14.3%; Cl, 15.8%. Found: N, 3.2%; P, 6.9%; S, 14.4%; Cl, 15.6%.

EXAMPLE 8

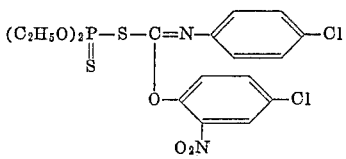

From equimolar amounts of the potassium salt of O,O-diethyl-thiolthiono-phosphoric acid and 4-chlorophenyl-isocyanide-(4-chloro-2-nitro-phenoxy) chloride there is obtained in the manner described in Example 6 a red-brown highly viscous oil which gradually crystallises upon prolonged standing.

Calculated: $C_{17}H_{17}O_5N_2PS_2Cl_2$—N, 5.7%; P, 6.3%; S, 12.9%; Cl, 14.4%. Found: N, 5.6%; P, 6.5%; S, 13.9%; Cl, 14.7%.

Nematicidal action:
With 200 p.p.m. 98%
With 100 p.p.m. 95%

Fungicidal action (*Fusarium culm.*):
With 200 p.p.m. 30%
With 100 p.p.m. 27%

Larvae of flies are killed completely with 0.01% solutions.

EXAMPLE 9

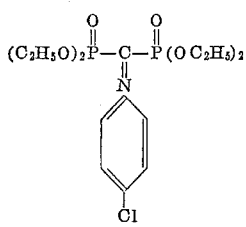

33.2 g. of triethyl phosphite and 21 g. of 4-chlorophenyl-isocyanide dichloride are combined while stirring. The temperature of the reaction mixture gradually rises to 40° C., ethyl chloride escaping from the mixture. After the reaction has subsided, the product is heated at 50–60° C., until the evolution of gas has fallen off. Subsequently, the product is fractionated under vacuum, a pale brown viscous oil going over as main fraction at 190–195° C./0.5 mm. Hg.

Calculated: $C_{15}H_{24}O_6NP_2Cl$—C, 43.7%; H, 5.8%; N, 3.6%; P, 15.1%; Cl, 8.6%. Found: C, 43.4%; H, 5.9%; N, 3.6%; P, 14.9%; Cl, 9.0%.

EXAMPLE 10

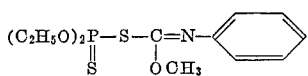

A solution of 22.4 g. of the potassium salt of O,O-diethyl-thionothiol-phosphoric acid in 200 ml. of alcohol is treated with 16.95 g. of phenylisocyanide-methyl ether chloride dissolved in 100 ml. of alcohol and the resulting mixture is then heated to the boil for about 90 minutes. The potassium chloride precipitated in the course of the reaction is filtered off with suction at room temperature and the filtrate concentrated by evaporation under vacuum. The residual pale yellow oil is distilled by fractionation under vacuum, a colourless clear oil of B.P. 151–153° C./0.1 mm. Hg. being obtained as main fraction.

Analysis.—Calculated for $C_{12}H_{18}O_3NPS_2$: C, 45.2%; H, 5.6%; N, 4.4%; P, 9.7%; S, 20.1%. Found: C, 45.6%; H, 5.6%; N, 4.8%; P, 9.6%; S, 19.9%.

In a similar manner, but with the use of an equivalent amount of phenylisocyanide ethyl ether chloride, the compound

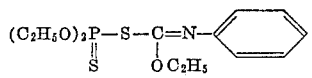

is obtained as a pale yellow clear oil.

EXAMPLE 11

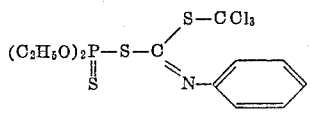

10.2 g. of the ammonium salt of O,O-diethyl-thionothiol-phosphoric acid dissolved in 75 ml. of acetone are added dropwise while stirring to a solution of 14.5 g. of phenyliso cyanide-trichloromethyl thio ether chloride in 50 ml. of acetone. After termination of the slightly exothermic reaction, the precipitated ammonium chloride is filtered off with suction and the yellow-brown filtrate concentrated by evaporation under vacuum. A crystalline yellow residue is thus obtained which is re-crystallised from petrol or alcohol. The yellow crystals melt at 90–92° C. Yield: 20 g.

Analysis.—Calculated for $C_{12}H_{15}O_2NPS_3Cl_3$: N, 3.2%; P, 7.1%; S, 21.9%; Cl, 24.3%. Found: N, 3.3%; P, 6.9%; S, 21.8%; Cl, 25.0%.

EXAMPLE 12

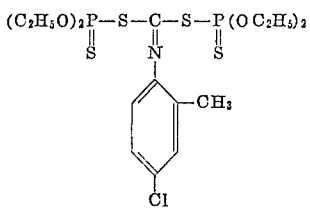

A solution of 13.8 g. of 2-trifluoromethyl-4-chlorophenylisocyanide dichloride in 75 ml. of acetone is added dropwise while stirring to a solution of 22.4 g. of the potassium salt of O,O-diethyl-thionothiol-phosphoric acid in 150 ml. of acetone and, after termination of the slightly exothermic reaction, the mixture is heated to the boil for about ½ hour. The precipitated potassium chloride is filtered off with suction at room temperature and the filtrate concentrated by evaporation under vacuum. A clear green-brown oil is obtained as residue.

Analysis.—Calculated for $C_{16}H_{23}O_4NP_2S_4ClF_3$: N, 2.4%; P, 10.7%; S, 22.2%; Cl, 6.2%; F, 9.9%. Found: N, 2.7%; P, 10.0%; S, 21.9% Cl, 6.8%; F, 9.8%.

Helminticidal action on sheep (Haemonchus): 100 mg./kg.=100% killing.

EXAMPLE 13

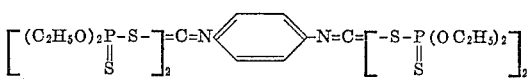

A solution of 64.8 g. of the potassium salt of O,O-diethyl-thionothiol-phosphoric acid in 200 ml. of acetone is treated with 13.5 g. of phenyl-1,4,-bis-isocyanide dichloride dissolved in 100 ml. of acetone and the mixture is heated to the boil for about 1 hour. The precipitated potassium chloride is filtered off with suction and the filtrate concentrated by evaporation under vacuum whereupon a crystalline yellow residue is obtained which is re-crystallised from alcohol. The yellow crystals melt at 108–109° C.

Analysis.—Calculated for $C_{24}H_{44}O_8N_2P_4S_8$: N, 3.2%; P, 14.3%; S, 29.5%. Found: N, 3.4%; P, 14.0%; S, 29.3%.

From 2-chlorophenyl-1,4-bis-isocyanide dichloride and alkali metal salts of O,O-diethyl-thionothiol-phosphoric acid there is obtained in a similar manner the compound

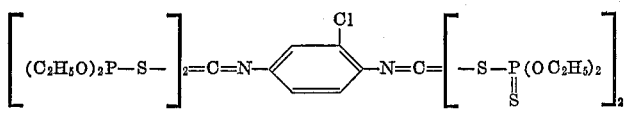

likewise in the form of yellow crystals melting at 89–90° C.

Helminticidal action on sheep (Haemonchus): 400 mg./kg.=100% killing.

EXAMPLE 14

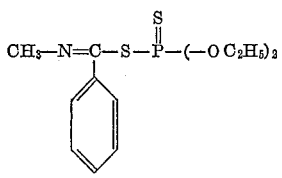

A solution of 15.4 g. of N-methyl-benzimide chloride in 50 ml. of acetone is added dropwise while stirring to a solution of 22.4 g. of the potassium salt of O,O-diethyl-thiolthiono-phosphoric acid in 150 ml. of acetone. In the course of the slightly exothermic reaction the reaction mixture turns yellow-brown, potassium chloride being separated out as a finely dispersed precipitate. When the reaction has subsided, the product is after-stirred for ½ hour and, after cooling down to about 20° C., filtered off with suction. The filtrate is concentrated by evaporation under vacuum, an orange-red clear oil remaining behind.

Yield: about 30 g. The product can be fractionated to a large extent without decomposition in a high vacuum. B.P. 144–147° C./0.08 mm. Hg.

In a similar manner to that described in the foregoing paragraph but with the use of the potassium salt of O,O-dimethyl-thionothiol-phosphoric acid, the compound

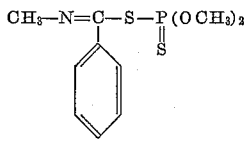

is obtained in the form of a red-brown oil which crystallises upon cooling. By careful re-crystallisation from methanol there are obtained yellow-brown crystals of melting point 56° C. which however soon deliquesce when standing in the air.

EXAMPLE 15

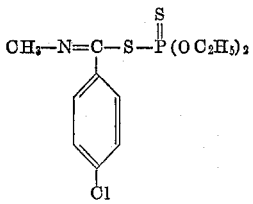

When reacting in the manner described in Example 14 equimolar amounts of the sodium salt of O,O-diethyl-thiolthiono-phosphoric acid and N-methyl-4-chlorobenzimide chloride in acetone as solvent, the above compound is obtained as a red-brown clear oil in a yield of about 90%.

Cockroaches, grain weevils and larvae of flies are killed completely with 0.1% solutions. Mosquito larvae are killed completely with 0.001% solutions.

By the same way there may be obtained the compound of the following formula

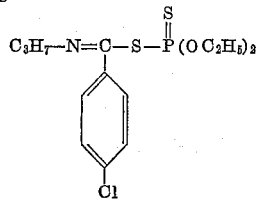

EXAMPLE 16

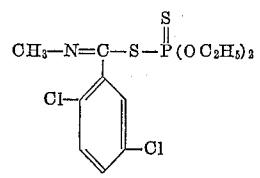

When reacting the potassium salt of O,O-diethylthiol-thiono-phosphoric acid with N-methyl-2,5-dichlorobenzimide chloride in a molar ratio of 1:1 in acetone, the above compound is obtained as an orange-red clear oil in a yield of more than 90%.

EXAMPLE 17

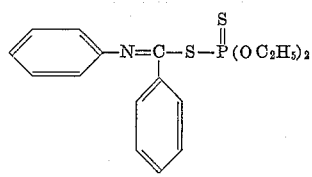

A solution of 21.6 g. of benzanilide-imide chloride in 100 ml. of acetone is added dropwise while stirring to a solution of 22.4 g. of the potassium salt of O,O-diethyl-thiolthiono-phosphoric acid in 150 ml. of acetone. In the course of the slightly exothermic reaction the initially clear and colourless solution turns orange-red and becomes cloudy while finely dispersed potassium chloride separates out. Subsequently, the reaction mixture is heated to the boil for about 5 minutes and filtered off with suction at room temperature. The filtrate is concentrated by evaporation under vacuum whereupon a red-brown cloudy oil remains behind. The oil is taken up with gasoline and filtered until clear of small amounts of insoluble portions. After evaporation of the gasoline under vacuum, a red-brown clear oil remains behind.

Calculated for $C_{17}H_{20}O_2NPS_2$: N, 3.84%; P, 8.5%; S, 17.5%. Found: N, 3.81%; P, 7.9%; S, 17.3%.

By the same way there may be obtained the compound of the following formula

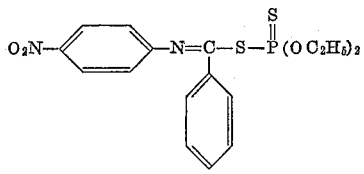

EXAMPLE 18

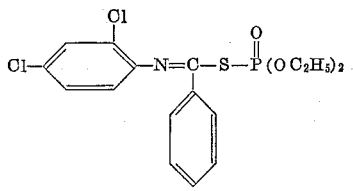

When reacting equimolar amounts of the potassium salt of O,O-diethyl-thiolthiono-phosphoric acid with 2,4-dichlorobenzanilide-imide chloride in acetone, the above compound is obtained as a red-brown clear oil in a yield of more than 90%.

Calculated for $C_{17}H_{18}O_2NPS_2Cl_2$: 16.4%. Found: Cl, 16.3%.

EXAMPLE 19

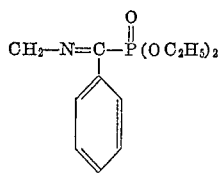

A solution of 15.4 g. of N-methyl-benzimide chloride in 50 ml. of benzene is added dropwise with vigorous stirring to a solution of 16.6 g. of triethyl phosphite in 50 ml. of benzene. The exothermic reaction is expediently moderated by cooling with ice-water so that the temperature of the mixture does not exceed about 35° C. During the reaction a colourless precipitate separates out. After completion of the reaction, the mixture is heated to the boil whereupon the precipitate soon dissolves completely. The clear yellow-brown reaction mixture is then cooled down and concentrated by evaporation under vacuum, a pale yellow clear oil remaining behind which is not distillable without decomposition.

EXAMPLE 20

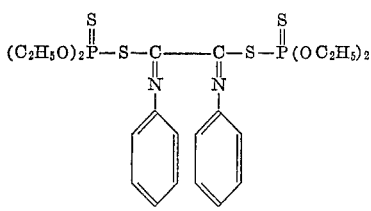

A solution of 22.4 g. of the potassium salt of O,O-diethyl-thiolthiono-phosphoric acid in 100 ml. of acetone is added dropwise while stirring to a suspension of 13.9 g. of oxanilide-diimide chloride in 150 ml. of acetone. The reaction mixture acquires a brown-yellow colour whereupon the initially insoluble diimide chloride gradually goes into solution and the temperature of the mixture rises to 35–40° C. At the same time, the solution becomes cloudy due to precipitating potassium chloride. After further stirring for about 15 minutes, the product is filtered off with suction at room temperature and the filtrate concentrated by evaporation under vacuum. A red-brown highly viscous oil remains behind which crystallises upon rubbing with petroleum ether. After recrystallisation from isopropanol, yellow crystals of M.P. 85–86° C. are obtained.

Calculated for $C_{22}H_{30}O_4N_2P_2S_4$: C, 45.8; H, 5.2; N, 4.9; S, 22.2; P, 10.8. Found: C, 45.4; H, 5.4; N, 5.3; S, 22.6; P, 10.5.

EXAMPLE 21

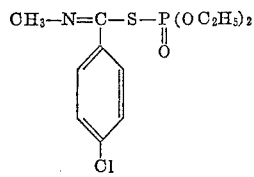

A solution of 18.8 g. of N-methyl-4-chloro-benzimide chloride in 50 ml. of acetone are added dropwise while stirring to a solution of 18.7 g. of the ammonium salt of O,O-diethyl-thiolthiono-phosphoric acid in 150 ml. of acetone. In the course of the moderately exothermic reaction, the reaction mixture turns intensely brown-yellow, ammonium chloride being separated out simultaneously as a finely dispersed precipitate. The product is heated to the boil for ¼ hour and the precipitated ammonium chloride is filtered off with suction at room temperature.

The clear yellow filtrate is concentrated by evaporation under vacuum, 32 g. of a red-brown clear oil being obtained as a residue.

Calculated for $C_{12}H_{17}O_3NPSCl$: C, 44.7%; H, 5.6%; N, 4.4%; P, 9.6%; S, 10.0%; Cl, 11.0%. Found: C, 45.0%; H, 5.7%; N, 4.8%; P, 9.6%; S, 10.1%; Cl, 11.3%.

EXAMPLE 22

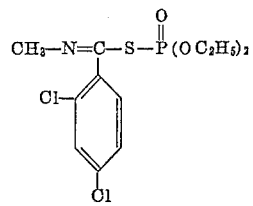

When reacting equimolar amounts of the ammonium salt of O,O-diethyl-thiol-phosphoric acid with N-methyl-2,4-dichloro-benzimide chloride in acetone in the manner described in Example 21, the above mentioned compound is obtained as a yellow-brown clear oil in a yield of more than 90%.

Calculated for $C_{12}H_{16}O_3NPSCl_2$: C, 40.3%; H, 4.5%; N, 3.9%; P, 8.7%; S, 9.0%; Cl, 19.8%. Found: C, salt of O,O-diethyl-thiol-phosphoric acid with N-methyl-40.7%; H, 4.6%; N, 4.1%; P, 8.6%; S, 9.0%; Cl, 20.4%.

EXAMPLE 23

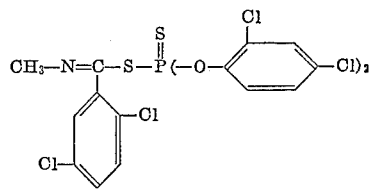

22.3 g. of N-methyl-2,5-dichlorobenzimide dissolved in 150 ml. of benzene are added dropwise to a suspension of 38.7 g. of the potassium salt of O,O-bis-(2,4-dichlorophenyl)-thionothiol-phosphoric acid. After termination of the slighty exothermic reaction, the precipitated potassium chloride is filtered off with suction and the clear brown filtrate evaporated to dryness under vacuum, whereupon about 50 g. of a wine-red oil remain behind as a residue. Upon cooling, the oil solidifies in a crystalline form. After re-crystallisation from acetic ester, the yellow crystals melt at 95–97° C.

Analysis.—Calculated for $C_{20}H_{12}NPS_2Cl_6$—N, 2.3%; P, 5.1%; S, 10.6%; Cl, 35.1%. Found: N, 2.6%; P, 4.9%; S, 10.2%; Cl, 34.9%.

EXAMPLE 24

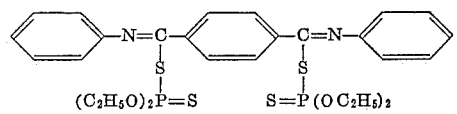

From N,N'-bisphenyl-terephthalyl-diimide dichloride and the potassium salt of O,O-diethyl-thionothiol-phosphoric acid there are obtained in the manner described in Example 20 deep red crystals of melting point 135–137° C.

Analysis.—Calculated for $C_{28}H_{34}O_4N_2P_2S_4$: N, 4.3%; P, 9.5%; S, 19.7%. Found: N, 4.6%; P, 9.3%; S, 19.6%.

EXAMPLE 25

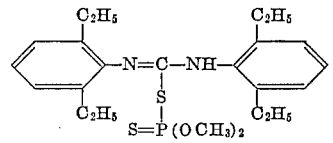

Into a solution of 15.2 grams of 2.2'.6.6'-tetra-ethyl-diphenylcarbo-diimide and 100 ml. of benzene there is introduced while stirring a solution of 7.9 grams of O,O-dimethyl-thiol-thionophosphoric acid and 25 ml. of benzene. The temperature rises to ~40° C. and is then kept for about ½ hour at 50–60° C. while stirring. Thereafter the solvent is distilled off in vacuo. Thereby is obtained a colorless oily residue, which after a short time crystallizes. After recrystallization from methanol there are obtained colorless crystals of M.P. 72–74° C.

EXAMPLE 26

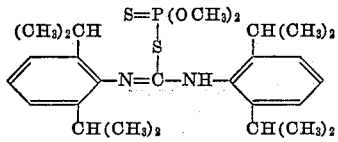

Into a 20% solution of 1/10 mol of 2.2'.6.6'-tetra-isopropyl-diphenylcarbodiimide in benzene there is introduced while stirring a 10% solution of 1/10 mol of O,O-dimethyl-thiol-thionophosphoric acid in benzene. Stirring of the exothermic reaction is continued for about ½ hour at 45–60° C. Thereafter the solvent is distilled off in vacuo and the residue is recrystalized from methanol. There are obtained colorless crystals of M.P. 116–118° C.

EXAMPLE 27

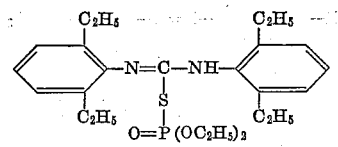

By reacting equimolecular amounts of 2.2'.6.6'-tetra-ethyl-diphenylcarbodiimide and O,O-diethyl-thiolphosphoric acid in benzene (as a solvent) there is obtained a light yellow oil while working up is carried out as described in Examples 25 and 26. After recrystallization from gasoline there are obtained colorless crystals of M.P. 75° C.

EXAMPLE 28

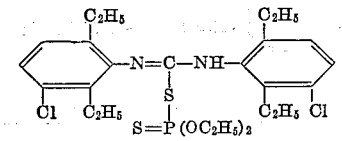

In exactly the same manner as said in Examples 25 and 26 there is obtained from 2.2'.6.6'-tetraethyl-3.3'-dichloro-diphenyl-carbodiimide and O,O-di-ethylthiol-thionophosphoric acid the compound of the above formula in form of colorless crystals of M.P. 104° C.

EXAMPLE 29

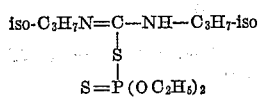

Benzenic solutions of 12.6 grams of N.N'-diisopropyl-carbodiimide and 18.6 grams of O,O-diethylthiolthionophosphonic acid are reacted with each other, in a manner as described in Examples 25 and 26. There is obtained after distilling off the solvent in vacuo a colorless viscous oil, which is not crystallizing.

EXAMPLE 30

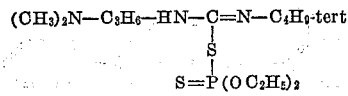

As described in Examples 25 and 26 there are introduced while stirring into a solution of 9.1 grams of N-dimethylaminopropyl-N'-tetiary butylcarbodiimide in 50 ml. of benzene 9.3 grams of O,O-diethylthiolthionophosphoric acid in 50 ml. of benzene. While cooling with water the temperature is kept below about 35° C. and stirring is continued for ¾ hour at this temperature. Thereafter the solvent is distilled off in vacuo. There is obtained a residue being a colorless clear oil, which is not crystallizing.

In a similar manner as described in the foregoing examples there may be obtained the compounds of the following formulae:

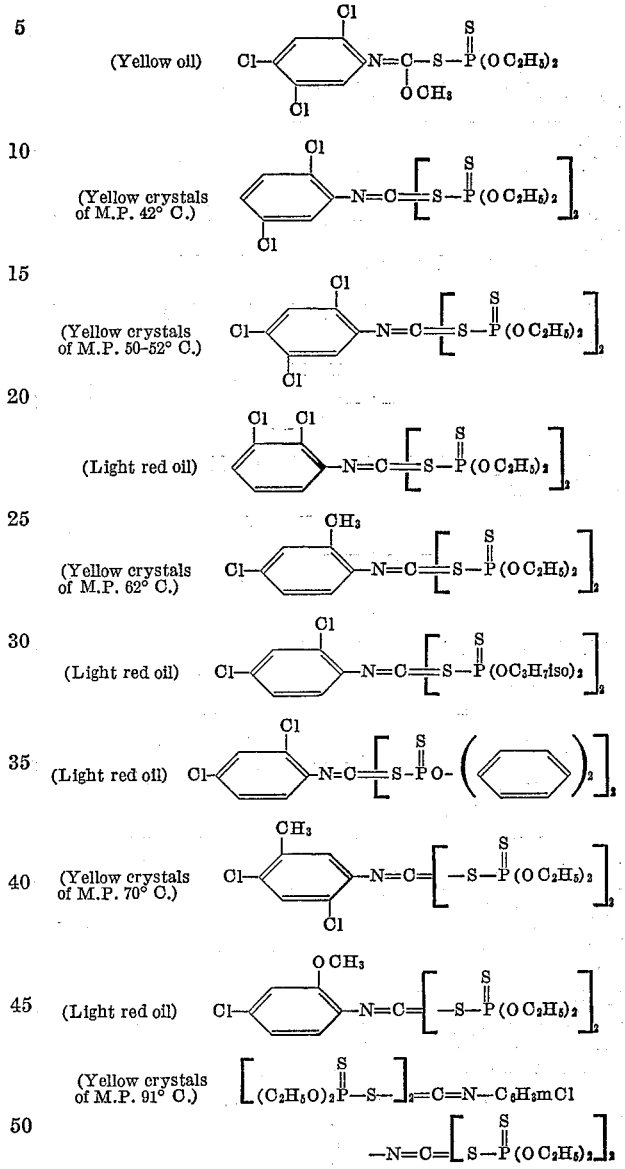

We claim:
1. A compound of the formula

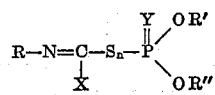

in which Y is a member selected from the group consisting of oxygen and sulfur, R' and R" are each members of the group consisting of lower alkyl having up to 4 carbon atoms, phenyl and halophenyl; R is a member selected from the group consisting of lower alkyl having up to 4 carbon atoms, phenyl, halophenyl, nitrophenyl, and lower alkylphenyl; X is a member selected from the group consisting of lower alkyl having up to 4 carbon atoms, lower alkoxy, a phenyl radical, a phenoxy radical, di-lower alkylamino, an anilino radical, a radical represented by the formula

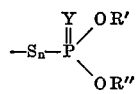

and a radical represented by the formula $$-R_n-\underset{\underset{R}{\overset{}{N}}}{\overset{Y}{\underset{\|}{C}}}-S-\overset{O R'}{\underset{O R''}{P}}$$

Y, R', R'', and R in these radicals having the same meanings set forth above; and n is a whole number from 0 to 1.

2. A compound of claim 1 wherein X is lower alkyl having up to 4 carbon atoms.

3. A compound of claim 1 wherein X is a phenyl radical.

4. A compound of claim 1 wherein X is an anilino radical.

5. A compound of claim 1 wherein X is a radical of the formula $$-S_n-\overset{Y}{\underset{\|}{P}}\overset{O R'}{\underset{O R''}{}}$$

6. A compound of claim 1 wherein X is a radical of the formula $$-R_n-\underset{\underset{R}{\overset{}{N}}}{\overset{Y}{\underset{\|}{C}}}-S-\overset{O R'}{\underset{O R''}{P}}$$

7. A compound of the formula $$\begin{array}{c} R'O \\ R''O \end{array} \overset{Y}{\underset{\|}{P}}-S \diagdown \quad \diagup S-\overset{}{\underset{}{P}}\overset{O R'}{\underset{O R''}{}} \\ \quad\quad C=N-X-N=C \\ \begin{array}{c} R'O \\ R''O \end{array} \overset{}{\underset{}{P}}-S \diagup \quad \diagdown S-\overset{}{\underset{\overset{\|}{Y}}{P}}\overset{O R'}{\underset{O R''}{}}$$

in which Y is a member selected from the group consisting of oxygen and sulfur, R' and R'' are each members of the group consisting of lower alkyl having up to 4 carbon atoms, phenyl and halophenyl; R is a member selected from the group consisting of lower alkyl having up to 4 carbon atoms, phenyl, halophenyl, nitrophenyl, and lower alkylphenyl; and X is a member selected from the group consisting of phenyl and chlorophenyl.

8. The compound of the following formula $$(C_2H_5O)_2\underset{\underset{S}{\|}}{P}-S-\underset{\underset{\underset{\underset{Cl}{|}}{\underset{}{C_6H_4}}}{|}}{\overset{}{\underset{\|}{C}}}-S-\underset{\underset{S}{\|}}{P}(OC_2H_5)_2$$

9. The compound of the following formula $$(C_2H_5O)_2\underset{\underset{S}{\|}}{P}-S-\underset{\underset{\underset{\underset{Cl,Cl}{}}{C_6H_3}}{|}}{\overset{}{\underset{\|}{C}}}-S-\underset{\underset{S}{\|}}{P}(OC_2H_5)_2$$

10. The compound of the following formula $$(C_2H_5O)_2\underset{\underset{S}{\|}}{P}-S-C=N-\!\!\!\left\langle\!\!\!\bigcirc\!\!\!\right\rangle\!\!-Cl$$
with O-C₆H₃(Cl)(NO₂) substituent 11. The compound of the following formula $$(C_2H_5O)_2\underset{\underset{S}{\|}}{P}-S-\underset{\underset{N}{\|}}{C}-S-\underset{\underset{S}{\|}}{P}(OC_2H_5)_2$$
with CH₃, Cl-substituted phenyl on N 12. The compound of the following formula $$Cl\text{-}C_6H_3(Cl)(Cl)\text{-}N=C-S-\overset{S}{\underset{\|}{P}}(OC_2H_5)_2$$
with OCH₃

13. The compound of the following formula $$(2,4\text{-}Cl_2C_6H_3)\text{-}N=C\!\!\left[\!\!=\!\!S-\overset{S}{\underset{\|}{P}}(OC_2H_5)_2\right]_2$$

14. The compound of the following formula $$(2,4,5\text{-}Cl_3C_6H_2)\text{-}N=C\!\!\left[\!\!=\!\!S-\overset{S}{\underset{\|}{P}}(OC_2H_5)_2\right]_2$$

15. The compound of the following formula $$(2,3\text{-}Cl_2C_6H_3)\text{-}N=C\!\!\left[\!\!=\!\!S-\overset{S}{\underset{\|}{P}}(OC_2H_5)_2\right]_2$$

16. The compound of the following formula $$(2\text{-}OCH_3,4\text{-}Cl C_6H_3)\text{-}N=C\!\!\left[\!\!=\!\!S-\overset{S}{\underset{\|}{P}}(OC_2H_5)_2\right]_2$$

17. The compound of the following formula $$(2,4\text{-}Cl_2C_6H_3)\text{-}N=C\!\!\left[\!\!=\!\!S-\overset{S}{\underset{\|}{P}}(OC_3H_7\text{iso})_2\right]_2$$

18. The compound of the following formula $$(2,4\text{-}Cl_2C_6H_3)\text{-}N=C\!\!\left[\!\!=\!\!S-\overset{S}{\underset{\|}{P}}(O\text{-}C_6H_5)_2\right]_2$$

No references cited.

UNITED STATES PATENT OFFICE
CERTIFICATE OF CORRECTION

Patent No. 3,053,876                        September 11, 1962

Hugo Malz et al.

It is hereby certified that error appears in the above numbered patent requiring correction and that the said Letters Patent should read as corrected below.

Column 2, lines 61 to 65, the structural formula should appear as shown below instead of as in the patent:

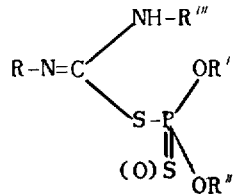

column 5, lines 54 to 62, the structural formula should appear as shown below instead of as in the patent:

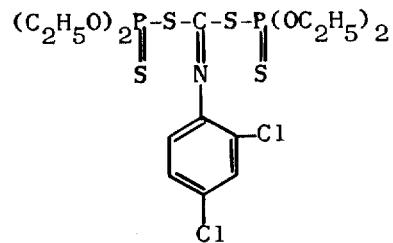

column 7, line 11, for "chlorophenyl ester" read -- chlorophenoxy --; column 8, lines 40 to 45, for that portion of the formula reading $CH_3$        read        $CF_3$ Signed and sealed this 12th day of November 1963.

(SEAL)
Attest:

ERNEST W. SWIDER                      EDWIN L. REYNOLDS
Attesting Officer                   Acting Commissioner of Patents